United States Patent [19]
Trudeau et al.

[11] Patent Number: 5,316,303
[45] Date of Patent: May 31, 1994

[54] HOLOGRAPHIC DISPLAY FOR PINBALL GAMES

[75] Inventors: John T. Trudeau, Melrose Park; Ernie S. Pizairo, Chicago, both of Ill.

[73] Assignee: Williams Electronics Games, Inc., Chicago, Ill.

[21] Appl. No.: 33,166

[22] Filed: Mar. 16, 1993

[51] Int. Cl.[5] ............................................... A63F 7/22
[52] U.S. Cl. ............................ 273/121 A; 273/118 A; 273/119 A
[58] Field of Search ................................ 273/118–125, 273/127 R; 359/1, 15

[56] References Cited

U.S. PATENT DOCUMENTS 4,323,241  4/1982  Deutsch .......................... 273/121 A

FOREIGN PATENT DOCUMENTS 3023878  1/1982  Fed. Rep. of Germany ... 273/127 R

OTHER PUBLICATIONS

"Holography" Play Meter Magazine, Dec. 1980, pp. 120–123.

Primary Examiner—Vincent Millin
Assistant Examiner—Raleigh W. Chin
Attorney, Agent, or Firm—Rockey, Rifkin and Ryther

[57] ABSTRACT

The visual display of the invention consists of a holographic display projected through the playfield. The display projects an image that is related to the playfield and is mounted on a flexible plate that is flexed by a rotating cam wheel. As the cam wheel flexes the plate mounted image appears to the player to move.

8 Claims, 3 Drawing Sheets

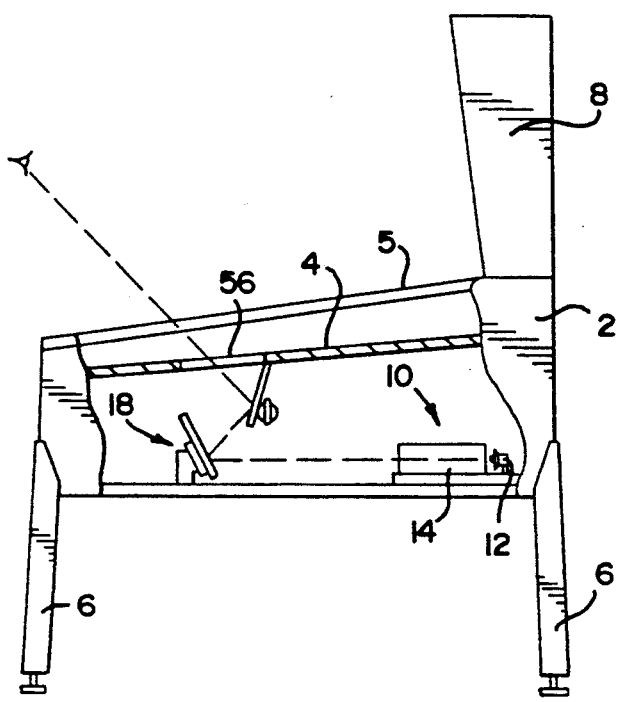
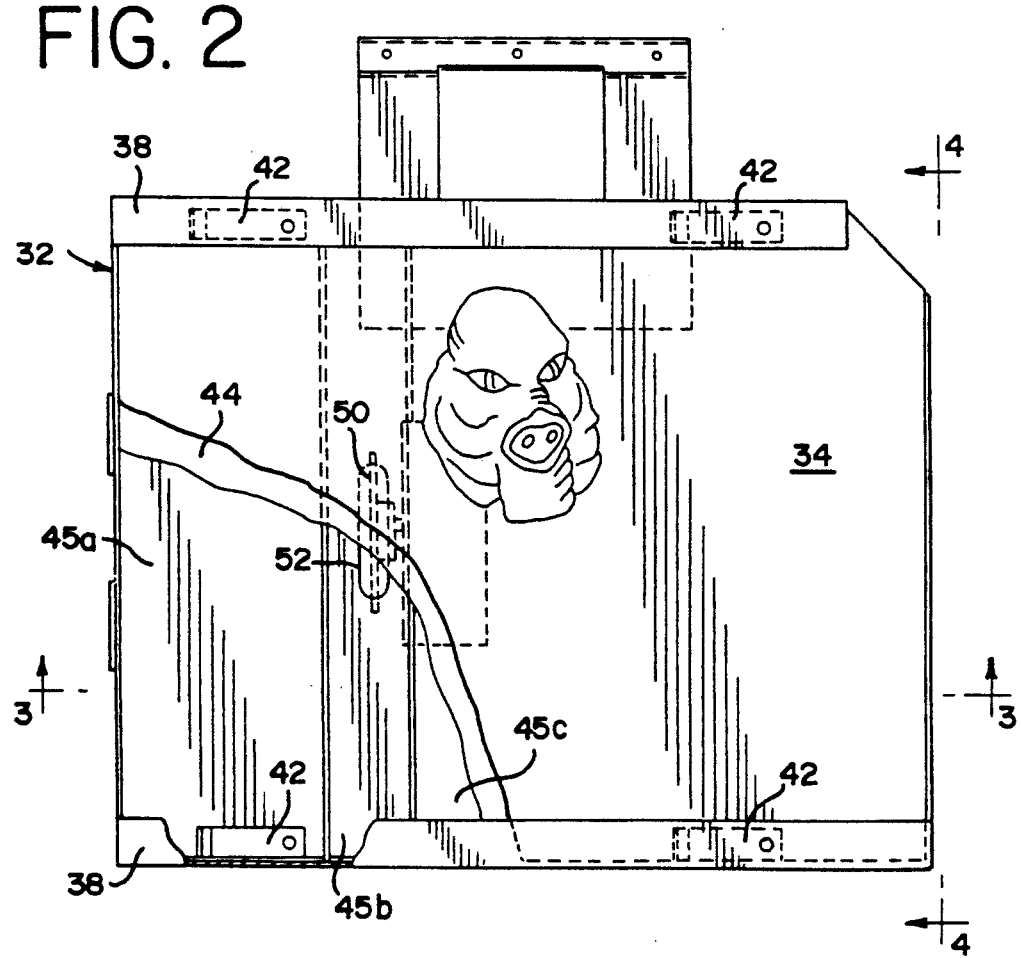

HOLOGRAPHIC DISPLAY FOR PINBALL GAMES

BACKGROUND OF THE INVENTION

The invention relates, generally, to pinball games and, more particularly, to a holographic display for such games.

Pinball games typically consist of an inclined play field supporting a plurality of play features such as bumpers, targets, ramps and the like and a rolling ball. The game player controls flippers mounted on the playfield to propel the ball at selected play features in an attempt to score points and control game play.

Pinball games are provided with a wide variety of art work and lighted displays on the playfield to attract game players and enhance the play of the game. Moreover, some modern pinball games are provided with video displays located remote from the playfield. The video displays consist of LED, liquid crystal displays or video screens and typically show visual images that relate to the play of the game.

While such video displays have proven to have player appeal, it is necessary for game manufacturers to continuously modify and update their games to maintain player interest. Thus, a new visual display for a pinball game is desired.

SUMMARY OF THE INVENTION

The visual display of the invention consists of a holographic display projected through the playfield. The display projects an image that is related to the playfield and is mounted such that the image appears to the game player to move. Specifically, the image is mounted on a flexible plate that is flexed by a rotating cam wheel. As the cam wheel flexes the plate, the mounted image will appear to the player to move in a first direction. Light from a light source is reflected to the hologram from an oscillating mirror causing the image to appear to move in a second direction.

BRIEF DESCRIPTION OF THE DRAWINGS

FIG. 1 shows the holographic video display of the invention mounted in a pinball game.

FIG. 2 shows a top view of the hologram assembly of the invention.

DETAILED DESCRIPTION OF THE INVENTION

Figure 3:
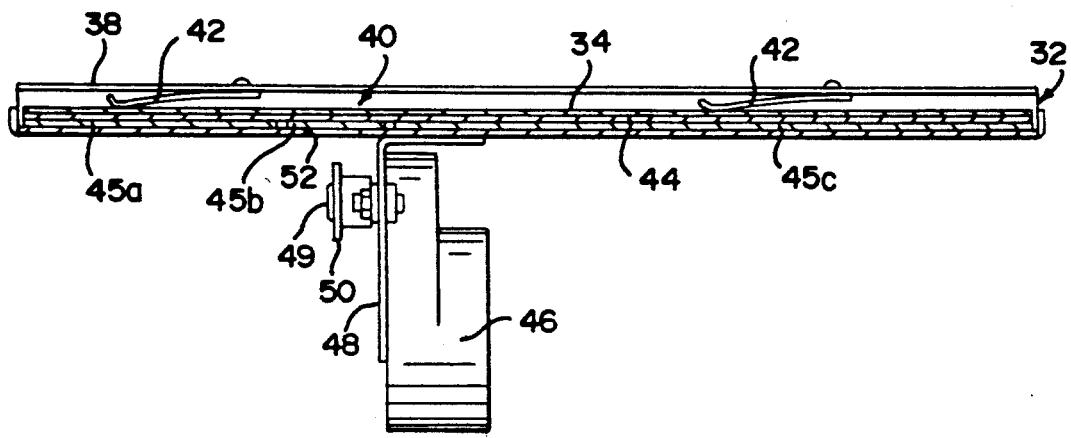
FIGS. 3 and 4 show detailed side views of hologram assembly of the invention.
Figure 4:
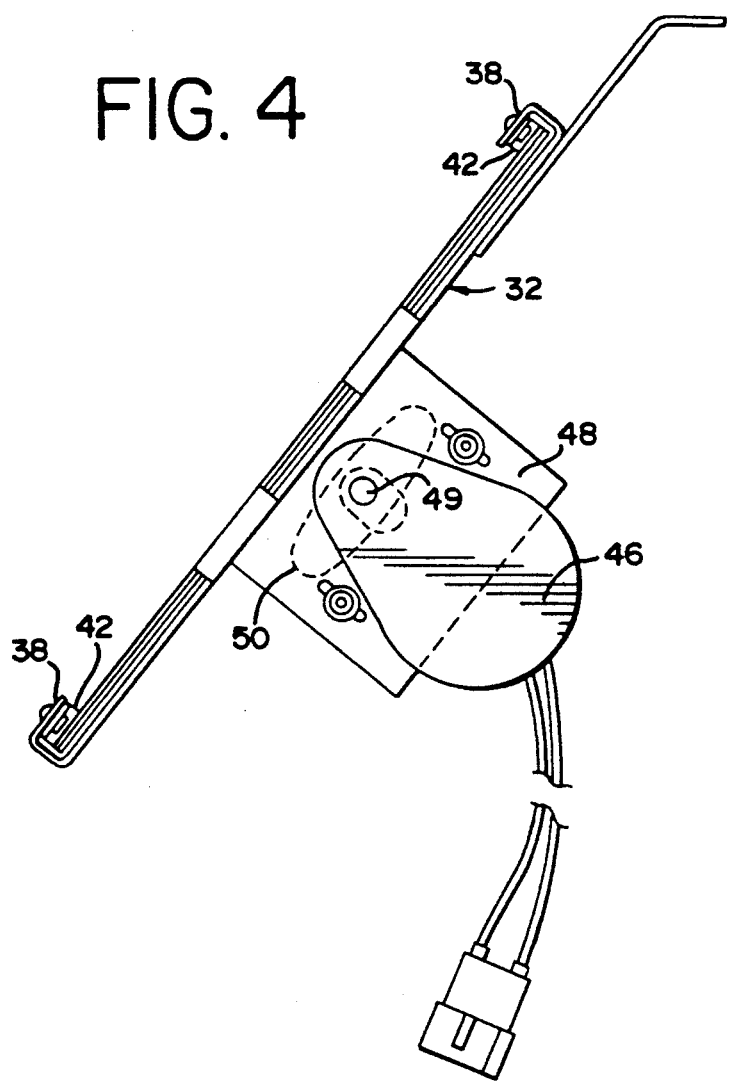

Referring more particularly to FIG. 1, the typical pinball game consists of a cabinet 2 supporting an inclined playfield 4. The playfield 4 supports a number of play features such as targets, bumpers, ramps and the like (not shown) and is covered by glass 5. The cabinet is supported on legs 6 and supports a back box 8.

Figure 5:
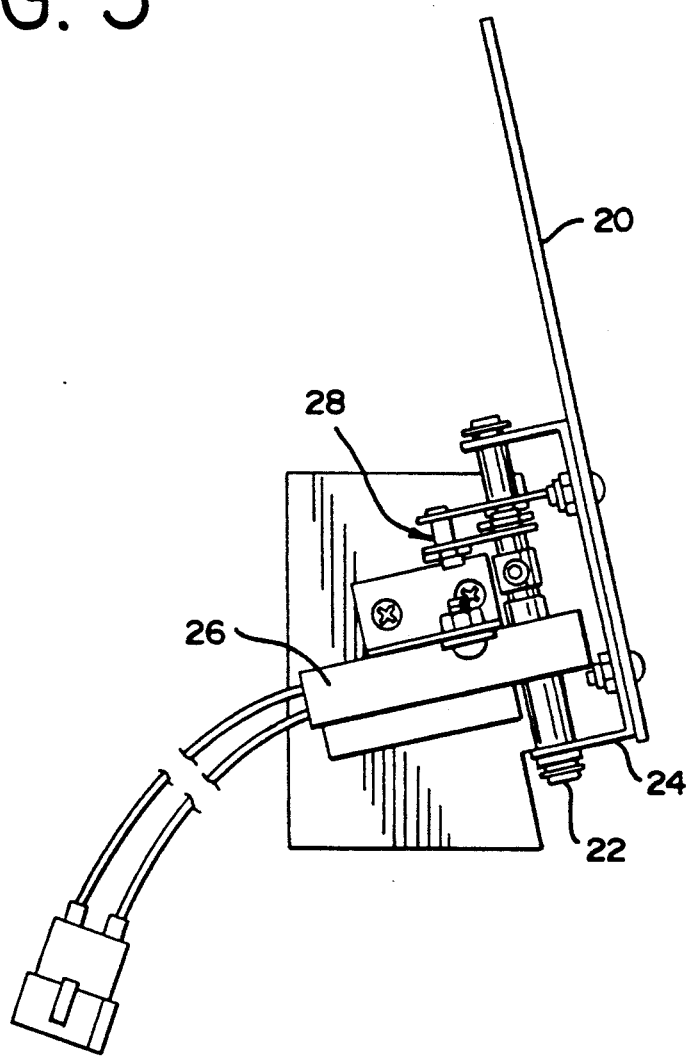
FIG. 5 shows a detailed side view of the mirror assembly of the invention.

The holographic video display of the invention consists of a light source 10 mounted in cabinet 2. The light source 10 consists of an incandescent lamp 12 and a reflector 14 for focussing the light. The light from source 10 is reflected at mirror assembly 18 onto hologram 34. Mirror assembly 18 is shown in greater detail in FIG. 5 and consists of a planar mirror 20 of a light reflecting material mounted on axle 22 by bracket 24.

A reciprocating motor 26 is operatively connected to bracket 24 by linkage 28. When motor 26 is activated, mirror 20 will be pivoted about axle 22. As a result, the light beam reflected off of mirror 22 will sweep back and forth over the hologram 34.

Hologram 34 is supported in a support bracket 32 that includes flanges 38 for retaining a hologram assembly 40. Hologram assembly 40 is retained in holder 36 by leaf springs 42 and consists of a relatively thin, flexible steel plate 44 on which hologram 34 is mounted. Attached to the steel plate 44 opposite the hologram 34 are three relatively thick, rigid steel plates 45a, 45b and 45c.

A drive motor 46 is mounted under holder 36 on flange 48. Output shaft 49 of motor 46 is connected to an eccentric cam 50. Motor 46 is arranged such that cam member 50 will extend through an aperture 52 in holder 36 to contact plate 45b. As cam 50 is rotated by motor 46, it will move plate 45b thereby to flex plate 44 and hologram 34 mounted thereon. Plates 45a, 45b and 45c are used to define the area of plate 44, and the corresponding area of hologram 34, that will be flexed.

Located on the playfield 4 is a clear window 56 of plastic or other suitable material through which the holographic image is viewed by the game player. A shroud (not shown) can be provided surrounding the hologram 34 to block the player's view of the interior of cabinet 2.

When the play feature is activated, for example by a player attaining a predetermined game objective, light source 10 is turned on and motors 26 and 46 are activated. The light travels along the path represented by dashed line in FIG. 1. As will be appreciated, the longer the path of light the better the holographic image such that the use of the reflective path enhances the holographic image.

Because mirror 20 is pivoted back and forth, the light will sweep over the image on hologram 34 causing the image to appear to the player to move left to right. Moreover, cam 50 will flex hologram 34 toward and away from the player making a portion of the image appear to move toward and away from the player.

Any suitable image can be created on hologram 34. The plates 44a, 44b and 44c can be arranged and cam member 50 located so as to flex different areas of the hologram 34 depending on the image used. Moreover, mirror 20 can be pivoted along an axis at an angle other than that shown to cause the image to move in other directions.

While the invention was described in some detail with respect to the drawings, it will be appreciated that numerous changes in the details and construction of the device can be made without departing from the spirit and scope of the invention.

What is claimed is:

1. A pinball game having an inclined playfield supporting a rolling ball and a plurality of play features one of said play features, comprising:
   a) a hologram mounted below the playfield;
   b) means for generating a light beam located below the playfield, said light beam being directed onto the hologram creating a hologram image; and
   c) means on the playfield for enabling the viewing of the hologram image.

2. The play feature of claim 1, further including means for moving said light beam across the hologram.

3. The play feature according to claim 2, wherein said means for moving includes a mirror reflecting said light beam into said hologram, and means for reciprocating said mirror to move said reflected light beam.

4. The play feature of claim 1, further including means for flexing said hologram whereby the hologram image appears to move.

5. The play feature according to claim 4, wherein said means for flexing includes a flexible member on which said hologram is mounted and means for flexing said flexible member.

6. The play feature according to claim 5, wherein a plurality of rigid plates are mounted to said flexible member to define the area of flex.

7. The play feature according to claim 6, wherein said means for flexing includes a cam engageable w of said plurality of rigid plates.

8. The play feature of claim 1, wherein said means for enabling the viewing includes a transparent window formed in the playfield.

* * * * *